(12) United States Patent
Wild

(10) Patent No.: US 6,664,101 B2
(45) Date of Patent: Dec. 16, 2003

(54) METHOD FOR SEPARATING $CO_2$ FROM WASTE GASES, CONVERTING IT TO $CH_4$ AND STORING SAME

(76) Inventor: Werner Wild, Al Faló, CH-6646 Contra (CH)

( * ) Notice: Subject to any disclaimer, the term of this patent is extended or adjusted under 35 U.S.C. 154(b) by 0 days.

(21) Appl. No.: 09/461,038

(22) Filed: Dec. 15, 1999

(65) Prior Publication Data

US 2003/0022324 A1 Jan. 30, 2003

(51) Int. Cl.[7] ............................. A61L 9/01; B09B 3/00; C12N 1/12; C12N 1/20
(52) U.S. Cl. ................. 435/262.5; 435/252.1; 435/266
(58) Field of Search ............................ 435/262.5, 822, 435/252.1, 266; 210/600, 610

(56) References Cited

U.S. PATENT DOCUMENTS 4,022,665 A * 5/1977 Ghosh .................... 195/27
5,439,054 A * 8/1995 Chaback et al. ............ 166/252
5,566,756 A * 10/1996 Chaback et al. ............ 166/263
5,643,795 A 7/1997 Hirate et al. ............. 435/299.1

FOREIGN PATENT DOCUMENTS

| DE | 4230644 | 3/1994 |
|---|---|---|
| EP | 0377405 | 7/1990 |

* cited by examiner

Primary Examiner—David M. Naff
Assistant Examiner—Deborah K. Ware
(74) Attorney, Agent, or Firm—Sughrue Mion, PLLC

(57) ABSTRACT

$CO_2$ is separated from waste gases by known technical methods and stored in underground cavities. By additions to the $CO_2$ according to the invention, of $H_2$ or $NH_3$, methanogenic bacteria, bacteria substrate, catalysators and/or inhibitors the $CO_2$ is reduced during the underground storage to $CH_4$. The storage is possible in aquifer, natural gas reservoirs or oil and/or gas generating rock formations. Due to the equal volumes of $CO_2$ and $CH_4$ the process is a closed cycle and of constant pressure. Natural gas becomes a renewable energy.

6 Claims, 1 Drawing Sheet

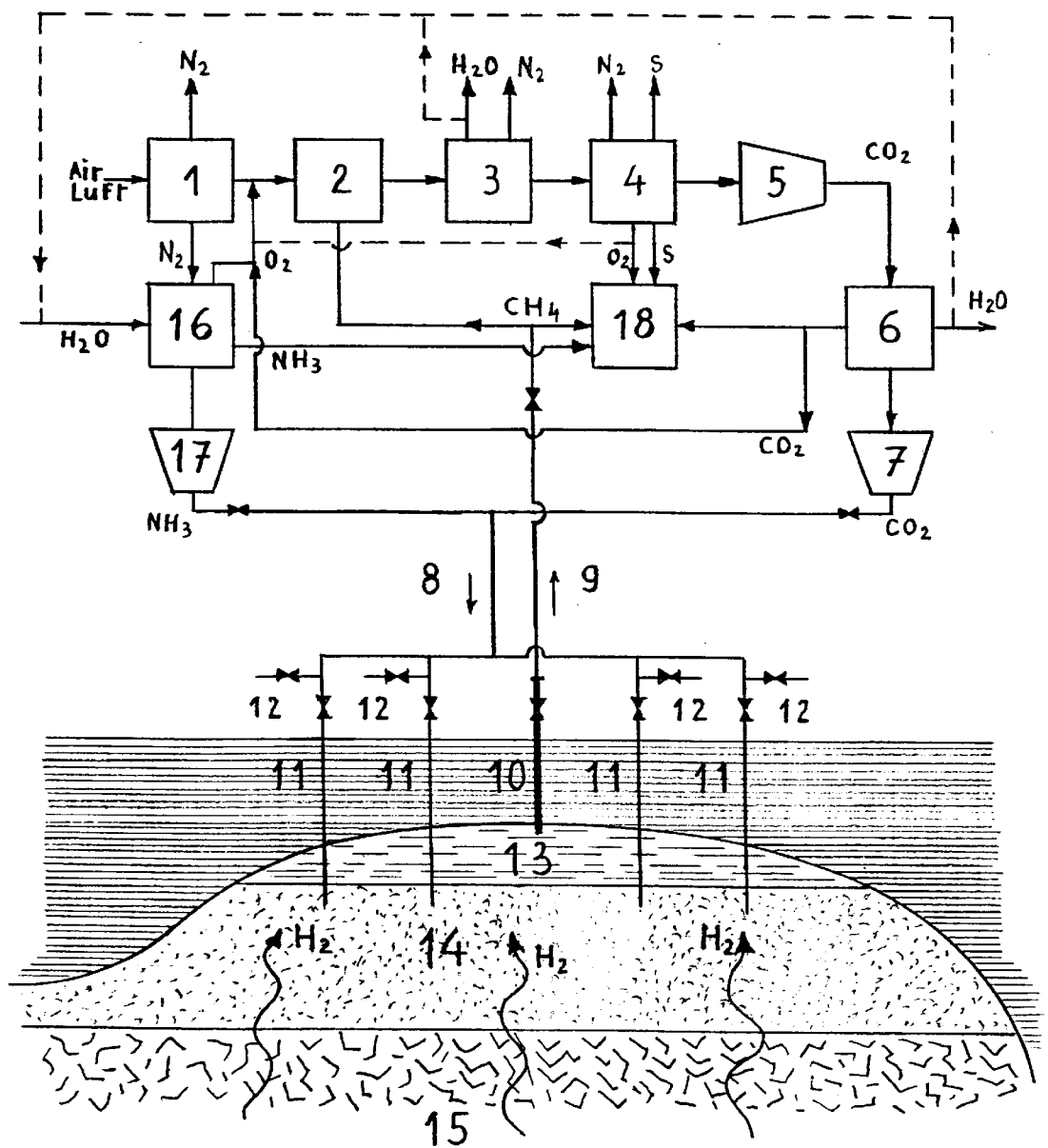

METHOD FOR SEPARATING $CO_2$ FROM WASTE GASES, CONVERTING IT TO $CH_4$ AND STORING SAME

BACKGROUND OF THE INVENTION

Beside the methane emanating from technical installations and by a natural way from the soil, carbon dioxide is the most important greenhouse gas. It destructs the ozone belt which is protecting life on earth from to intensive ultraviolet radiation.

Since more than a decade technicians and scientists are seeking for methods and means in order to eliminate the noxious $CO_2$ from waste gases and to store it in the form of an insoluble chemical compound or outside of the atmosphere of the earth. There are technically feasible proposals (partly tested in pilot plants) in order to separate the $CO_2$ from combustion or other waste gases, to concentrate it (by liquefing), to use it industrially or to store it underground (in aquifers, deep sea or to stimulate poorly producing oil reservoirs). One of the practical ways to concentrate the $CO_2$ consists of reintroducing the combustion $CO_2$ by a secondary cycle in the combustion process after having made the combustion-air nitrogen-free by catalytic and/or cryogenic separation. Instead of the use in neighbouring chemical plants, the binding of $CO_2$ on sea weed as well as the bacterial fermentation of the $CO_2$ in special reactors have been technically examined in pilot plants. These latter processes need either large storing volumes for the $CO_2$ resp. $CH_4$ produced or an absolutely constant operation of the $CO_2$ producing installations, because these binding resp. fermentation processes are not flexible. Specially thermal power plants demand such flexibility in order to cover daily, weekly and seasonal peaks.

SUMMARY OF THE INVENTION

The present invention permits such flexible operation. The invention comprises the pumping of the separated, purified, liquefied and dryed $CO_2$ in a pipeline to a nearby aquifer, a natural gas reservoir or an oil bearing structure and injecting the $CO_2$ into it and treating the structures in the first two cases previously with bacteria cultures (and ev. suitable substrate). In the third case the methanogenic bacteria and the substrate will be already naturally present so that the conversion of the $CO_2$ to $CH_4$ may immediately begin. For that purpose the following conditions have to be naturally present or artificially created (see bibliography in the annex):

1. There has to be enough $H_2$ for reduction of the $CO_2$ (or as electron donor) in the structure (underground reservoir), either in free form produced by metamorphic rock in the depth, or by bacterial direct transmission from organic $H_2$ containing substrate, or by bacterial splitting off of the pore water, or by artificial feeding of $H_2$ in pure form of ammonia ($NH_3$) which forms in the structure (underground reservoir), in contact with the pore water, partly ammoniumhydroxide $NH_4OH$ and with $CO_2$ urea $(H_2N)_2CO$ which, by bacterial aided hydrolyzing, splits off free $H_2$, or e.g. by artificial feeding of formiates $NaHCO_2$ or $Ca(HCO_2)_2$.

2. The sulfate content of the sediment in the structure (underground reservoir) has to be either enough poor that the sulfate no more can selectively bind the $H_2$ necessary for the $CO_2$ reduction, and/or no $H_2S$ or other sulfide may act as methanogenic poison, or the sulfate competing with the $CO_2$ reduction may be artificially blocked by an inhibitor (e.g. NA-molybdate or fluorlactate), or by feeding $H_2$ in to the structure (underground reservoir) enough long before the $CO_2$ injection, so that the sulfate will be sufficiently reduced.

3. There must be present in the sediment a methanogenic bacterial population large enough (e.g. methanococcus, methanobacterium formicicum, methanobacterium thermoautotrophicum, methanosarcina barkerii, or other photosynthetic bacteria) which is able, to split off free $H_2$ from the pore water or from $H_2S$, and to reduce the $CO_2$ to $CH_4$ sufficiently, eventually by addition of catalysators like e.g. palladium, adding, if necessary, the needed bacterial population and/or the substrate artificially.

The main condition to realize the $CO_2$ conversion is a drilling (in a aquifer, a natural gas reservoir or an oil bearing formation) across the gas or oil containing structure till in the aquatic phase thereunder, with cores from the interesting stratums and analyzing these cores in the laboratory.

The main aim is finding (or not) the necessary bacteria, the substrate whereon they live, the chemical composition of all sediment parts, the presence of $H_2$, sulfate as well as the absence of Na—AL-silicates. With these results it will be further established under which conditions the found (or added) bacteria and the substrate are able to produce $CH_4$ from $CO_2$ and how much.

By adding other substrates (e.g. acetate, methanol, methylamine, dihydronicotinamide, dihydro-5-diazaflavine, 2-mercaptoethane-sulfonic acid and like) it will be established if the $CO_2$ reduction to $CH_4$ is intensified resp. accelerated. With a given substrate the addition of $CO_2$, in the presence of $H_2$, increases the $CH_4$ production normally by more than one magnitude. The same is the result when $H_2$ is added in presence of $CO_2$. Consequently, both gases have to be present together for ensuring an optimal $CH_4$ production. In this connection it may be noted that the 4 H atoms needed for the $CH_4$ do not originate from the added $H_2$ gas (or $NH_3$), but from the pore water. The $H_2$ gas serves only as electron donor. All research work hitherto existing shows that bacteria and substrate are only a transition station for the $H_2$ necessary for $CO_2$ reduction. Consequently, during the laboratory experiments the consumption of bacteria and substrate,as well naturally present as also artificially added matter, has to be established. Concerning the practical use of the invention, a consumption of bacteria and/or substrate to high could dictate an economic limit.

As soon as the different questions are resolved by the laboratory experiments, the same tests are following under in situ conditions of pressure and temperature (still in the laboratory). This clarifying by steps conducts to the optimum method which is than tryed out in a pilot test 1:1 after a second drilling (observation drilling) in relative vicinity to the first drilling. If there is a flow direction of the pore water, the testing has to be made on the low side and the $CO_2$ addition on the high side of the flow. An increasing $CH_4$ content signifies a positive conversion, which is confirmed by an also increasing $H_2$ content.

This is specially the case with the addition of ammonia gas instead of pure $H_2$. The basic chemical transformation according to the formula $CO_2 + 4 H_2 = CH_4 + 2 H_2O$ becomes with ammonia in molecular writing 2 $CO_2$+6 $NH_3$=2 $CH_4$+3 $N_2$+4 $H_2O$+$H_2$, what means that the transformation yields a $H_2$ excess which passes over in the next step, so that, in constant operation, will be an equilibrium $CO_2$: $NH_3$ of approx. 1:2,7. But this will only be the case if the $H_2$ procurement is not aided by bacterial assistance. Such bacterial assistance liberates practically always supplemental $H_2$ from organic substrates or from pore water, eventually supported by $H_2$ from metamorphic rock, what reduces the $CO_2/NH_3$ proportion from 2,7 to 1 and less.

The $CO_2$ reduction produces in every case additional pore water. The use of $NH_3$ as $H_2$ donor has the special disadvantage of producing the double quantity of pore water compared to the use of pure $H_2$ and that 40% of the $NH_3$ gas remain as $N_2$ (ballast) in the structure and appear occasionally as pollution in the produced $CH_4$ and demand a separation (purification). Economically it could be better to inject pure $H_2$ under high pressure as emulsion in the liquid $CO_2$ (with or without emulgators). At the maximum possible proportion of volume $CO_2$:$H_2$ of 1:4 the emulsion becomes foamy and at smaller $H_2$ requirements and higher pressure the $H_2$ is broken up in small gas bubbles in the liquid $CO_2$.

The liquid medium $CO_2$ covers than the inner surface of the steel tube and not the $H_2$ gas and forms a protection layer having itself a soluted proportion $H_2$:$CO_2$ (volume) of approx. 1:100 (at the normally present conditions of pressure and temperature) and protects in such manner the steel from brittleness by direct hydrogen attack. For this protection it is essential that there is a turbulent flow in order to maintain the $CO_2/H_2$ emulsion during injection in the structure. Moreover the structure temperature (approx. 80° C.) is not high enough to really cause hydrogen brittleness (over 300° C.). Because of the difficulty to control long pipelines, the $H_2$ should be produced in the field at the injection point. But there is no danger for an auto-reduction of the $CO_2$ to $CH_4$ within the $CO_2/H_2$ mix in the injection tube at the existing temperatures.

If the $CO_2$ conversion takes place in a aquifer, the addition of $H_2$, bacteria and/or substrate is unavoidable, but may be avoidable in a natural gas reservoir created by gas migration and is most probably not necessary in oil and gas bearing (generating) formations. The eventual additions beside the $CO_2$ ($NH_3$, $H_2$, bacteria, substrates, catalysators, inhibitors) shall not pollute the groundwater of aquifers being situated above the deep lying brack waters. For these latter the pollution aspect is of minor significance.

BRIEF DESCRIPTION OF THE DRAWINGS

The sole drawing is a schematic showing of the process according to the present invention.

DETAILED DESCRIPTION OF THE INVENTION

The enclosed drawing shows schematically and as an example a modern installation according to the invention, applied on a anticlinal structure. The drawings considers only process phases. In the whole process $N_2$ is considered as ballast. It is separated from the combustion air catalytically or cryogenically in phase 1, being afterwards vented directly to the atmosphere or e.g. in a $NH_3$ production plant 16. The remaining $O_2$, $CO_2$ from air, noble gases and some pollutants are burnt in the following combustion plant 2 (gas turbine, gas motor, boiler and like). In the separation plant 3 the combustion products $H_2O$ and $CO_2$ as well as $N_2$ (remaining $N_2$ or total $N_2$ in the case of absence of phase 1) are separated from each other. The catalysator plant 4 reduces resp. oxidizes the oxides NOx, $SO_2$, CO to $N_2$, elemental sulfur, oxygen and $CO_2$; feeding practically pure $CO_2$ in the compressor 5. Here the $CO_2$ is liquefied, cooled down (not shown in the drawing) and is stored in the reservoir 6. Eventually here accumulating water may be drained off in order to be reconducted in the process phase 16 or to the environment. Such reconduction is also possible for $CO_2$ from the reservoir 6 to the burning installation 2 (if there is air separation in phase 1) in order to create a combustion in a $O_2/CO_2$ atmosphere.

If there is no or not enough $H_2$ present in the storage and conversion structure 13, 14 to ensure complete reduction of the $CO_2$, the process is equipped with an ammonia plant 16. The nitrogen $N_2$ for the production of $NH_3$ comes from the phase 1, the necessary $H_2$ from fresh water and the stripped off $O_2$ will be sent in the combustion process in phase 2.

$CO_2$ and $NH_3$ are pumped on identical high pressure in the compressors 7 resp. 17 and flow as a mix along the pipeline 8 to the storage field 13. If during this transport urea $(H_2N)_2CO$ should be formed from the $CO_2/NH_3$ mix, it is only of interest in view to the also forming $H_2O$ as byproduct, because this water would form together with the $CO_2$ the acid $H_2CO_3$ which could attack the pipeline by internal corrosion. At the same moment the $NH_3$ would form in the presence of $H_2O$ the basic $NH_4OH$ able to neutralize—at least partly—the dangerous $H_2CO_3$. It is indicated to check for internal corrosion and to add eventually a corrosion inhibitor. Another possibility is the batchwise separated transport of the liquid $CO_2$ and $NH_3$ as usual in oil and product pipelines.

According to the idea of the present invention, the storage field (aquifer, natural gas reservoir, oil generating rock structure) serves as conversion reactor for the $CO_2$: The injection drillings 11 for the $CO_2$, the $H_2$ (or $NH_3$) are arranged around the extraction drilling 10 for the $CH_4$ in such a manner that there will be a central flowing. In the drawing the 4 injection drillings 11 are unrolled to one plane, but in reality they are arranged in a square around the extraction drilling 10. The injection drillings 11 reach in the pore water containing part 14 of the anticlinale, because the reduction of the $CO_2$ to $CH_4$ takes place in this part. In order to take the cores for the laboratory experiments mentioned further above, the drilling 10 reaches initially the pore water part 14, is later cemented and than perforated. The $CH_4$ produced from the $CO_2$ is first stored in the water part 14 and—with increasing volume—comes in contact with the gaseous part 13 and forms so a compact gas phase. During the in situ tests in scale 1:1 mentioned above the drilling 10 reaches in the water part 14. From the injection drillings 11 the produced $CH_4$ is driven by a small overpressure to the extraction drilling 10. This technique is also used in the case of $CO_2$ pressuring (stimulation) of poorly producing oil fields. This known technique also provides for a rich experience concerning the compatibility of the rock and $CO_2$.

Each injection drilling 11 has a nozzle 12 for the injection of separate additions of bacteria, substrates, inhibitors and/or catalysators. The extraction drilling 10 is joined at his head to the gas pipeline 9 which in her turn is joined to the combustion plant 2. Under the aquifer 14 with the gas reservoir 13 there is the rock basis 15, furnishing eventually enough $H_2$ diffusing from metamorphic rock in the depth to the top.

The operation of the field installations is very similar to that of a natural gas storing field with injection and extraction drillings. The volumes of the consumed $CO_2$ and $CH_4$ formed from it being theoretically equal (appart from small losses), the pressure in the storage structure 13 (or conversion reactor 13) remains stable for a long time because there is a practically closed circuit $CO_2$—$CH_4$. The only supplemental feeding quantities are the $H_2$ donor (e.g. $NH_3$), catalysators, inhibitors and eventually bacteria and substrates. Natural gas becomes in this way a renewable energy.

In order to preserve clearness, the following installations are omitted from the drawing: pumps and compressors only for feeding and circulation purposes between the process phases, coolers, separators, compensation tanks and regulator parts.

In view to completeness the drawing shows also industries 18 in vicinity to the power plant 2, which can use as well $CH_4$ as $CO_2$ and other byproducts of the whole process. This guarantees an optimal utilization combined with high flexibility.

What is claimed is:

1. Method for separating $CO_2$ from waste gases of combustion plants, storing said $CO_2$ and bacterially converting said $CO_2$ to $CH_4$, comprising the steps of:

injecting said separated $CO_2$ in an underground natural reservoir in geological porous or finely cleaved sediment of an underground gas or oil field or aquifer which forms said natural reservoir, said reservoir being surrounded and covered by non-porous material; and converting said $CO_2$ to $CH_4$ through bacterial conversion and storing said $CO_2$ and $CH_4$ gases, within said reservoir.

2. Method according to claim 1, wherein the underground natural reservoir serves simultaneously as a bacterial-chemical reactor for the conversion of the $CO_2$ to $CH_4$ as well as storage space for $CO_2$ and $CH_4$.

3. Method according to claim 1, wherein the $CO_2$ is injected in the underground natural reservoir by means of drillings.

4. Method according to claim 3, wherein the injection of the $CO_2$ is accompanied by hydrogen spending substances, in gaseous or liquid form, continuously or batchwise.

5. Method according to claim 4, wherein $H_2$ gas is injected together with $CO_2$ in the form of a foam $H_2/CO_2$ or in the form of small $H_2$ bubbles emulgated in liquid $CO_2$.

6. Method according to claim 5, wherein said drillings are provided aboveground with a connecting pipe and nozzle in order to pump methanogenic bacteria, substrate as well as eventual catalysators and/or inhibitors.

* * * * *